(12) United States Patent
Gnad et al.

(10) Patent No.: US 7,868,518 B2
(45) Date of Patent: Jan. 11, 2011

(54) DEVICE FOR PROCESSING WORKPIECES

(75) Inventors: Gerhard Gnad, Keltern-Weiler (DE); Arnold Schneider, Ettlingen-Schluttenbach (DE)

(73) Assignee: Herrmann Ultraschalltechnik GmbH & Co. KG, Karlsbad-Ittersbach (DE)

( * ) Notice: Subject to any disclaimer, the term of this patent is extended or adjusted under 35 U.S.C. 154(b) by 0 days.

(21) Appl. No.: 12/616,161

(22) Filed: Nov. 11, 2009

(65) Prior Publication Data
US 2010/0050844 A1    Mar. 4, 2010

Related U.S. Application Data

(63) Continuation of application No. 11/715,420, filed on Mar. 8, 2007, now abandoned.

(30) Foreign Application Priority Data
Apr. 26, 2006    (DE) .................... 10 2006 020 417

(51) Int. Cl.
*H02N 2/02*    (2006.01)
(52) U.S. Cl. .................... 310/316.02; 310/311; 310/317
(58) Field of Classification Search ............ 310/316.02, 310/317, 311
See application file for complete search history.

(56) References Cited

U.S. PATENT DOCUMENTS

| | | | | |
|---|---|---|---|---|
| 3,141,982 A | * | 7/1964 | Smith | 307/149 |
| 5,938,677 A | * | 8/1999 | Boukhny et al. | 606/169 |
| 6,115,204 A | * | 9/2000 | Yokomachi et al. | 360/77.16 |
| 7,004,182 B2 | * | 2/2006 | Duval et al. | 134/184 |
| 2003/0209500 A1 | * | 11/2003 | Kock et al. | 210/748 |
| 2005/0105661 A1 | * | 5/2005 | Miller et al. | 375/376 |
| 2007/0251977 A1 | * | 11/2007 | Gnad et al. | 228/1.1 |

* cited by examiner

*Primary Examiner*—Walter Benson
*Assistant Examiner*—Bryan P Gordon
(74) *Attorney, Agent, or Firm*—Paul Vincent

(57) ABSTRACT

A device for processing workpieces uses ultrasound, with an resonant system comprising an ultrasound generator, an ultrasound sonotrode, and an anvil, wherein a workpiece is processed between the anvil and the ultrasound sonotrode. The ultrasound generator comprises a regulation means which has a regulation member connected upstream of the ultrasound generator to receive a feedback signal from the resonant system and to generate a regulation variable which is supplied to the ultrasound generator. A connecting point is provided between the regulation member and the ultrasound generator, at which the regulation variable of the regulation member is linked to a process variable from the processing procedure.

9 Claims, 2 Drawing Sheets

DEVICE FOR PROCESSING WORKPIECES

This application is a continuation of Ser. No. 11/715,420 filed Mar. 8, 2007 now abandoned and also claims Paris Convention priority of DE 10 2006 020 417.4 filed Apr. 26, 2006 the complete disclosures of which are hereby incorporated by reference.

BACKGROUND OF THE INVENTION

The invention concerns a device for processing workpieces using ultrasound, comprising an ultrasound generator, an ultrasound sonotrode, and an resonant system comprising an anvil, wherein a workpiece is processed between the anvil and the ultrasound sonotrode, and with a regulation means for the ultrasound generator, the regulation means comprising a regulation member connected upstream of the ultrasound generator, which receives a feedback signal from the resonant system, generates a regulation variable, and supplies it to the ultrasound generator.

The invention concerns a regulation device for an ultrasound generator for processing workpieces, in particular, welding or cutting them. An ultrasound generator in an resonant system generates oscillations, using an electroacoustic converter, within its resonance frequency, i.e. usually between 18 and 60 kHz. These oscillations operate an ultrasound sonotrode either directly or via a booster or converter. The ultrasound sonotrode, together with the anvil, represent the tool for processing the workpiece.

Conventional ultrasound generator regulation means measure certain system parameters and system signals which they obtain as information from the electrical and mechanical resonant system. These signals and parameters regulate the ultrasound generator. Changes within the resonant system are thereby detected and the resonant system is reset at the original value through suitable algorithms. Internal system parameters and signals are e.g. the resonant frequency, the current, the reactive current, the voltage, the phase position etc.

The main aim of all resonant systems is to keep the oscillation amplitude at a constant value with maximum efficiency. Since the resonance frequency of the overall resonant system, which consists of a mechanical and an electrical resonant circuit, constantly changes during operation, the regulation process must be permanently repeated and be as fast as possible. The changes or disturbances in the resonant system are due to load changes (e.g. force fluctuations), changes of the geometry due to heating, fluctuations in the energy supply etc. The regulation improves with accelerated repetition rate of the regulation process and better adjustment of the regulation algorithm. Oscillation of the regulation circuit must be prevented in any case. This means, however, that the regulation parameters cannot be set at excessively high values.

Prior art discloses analog and digital systems (DE-A-40 25 637, DE-A-44 00 210, DE-A-42 30 491, DE-A-42 08 669, EP-A-0 173 761 and U.S. Pat. No. 4,808,948). Irrespective thereof, the parameters provided in the resonant system are the basis for regulating the ultrasound generators. These conventional resonant systems are disadvantageous in that very fast load changes often cause considerable amplitude fluctuations. These fluctuations can, in case of excess, cause the limit values of the mechanical components to be exceeded, thereby damaging them or resulting in insufficient welding.

It has turned out that the regulation does not react sufficiently rapidly. This is mainly due to the system-related parameters and signals. These change with load changes, but reach the regulation member of the ultrasound generator with a certain delay. This delay is mainly predetermined by the speed of sound and the number of mechanical oscillation components.

This means, however, that the regulation member reacts to an event under extreme conditions only when this event is over. Keeping the oscillation amplitude constant on the basis of the system parameters and signals is very difficult. Fast load changes of less than 5 ms therefore produce considerable fluctuations in the oscillation amplitude.

It is therefore the underlying purpose of the invention to further develop a device of the above-mentioned type in such a fashion that it reduces the amplitude fluctuations during fast load changes.

SUMMARY OF THE INVENTION

This object is achieved in accordance with the invention with a device of the above-mentioned type in that a connecting point is provided between the regulation member and the ultrasound generator, at which the regulation variable of the regulation member is connected to a process variable of the processing procedure.

The inventive device, in particular the inventive regulation device, performs regulation not only on the basis of the parameters and signals of the resonant system, but also on the basis of at least one additional, external signal. This additional external signal is connected to the processing procedure, but is generated outside of the electric and mechanical resonant circuits. It is therefore outside of the resonant system, but has a time dependence which reflects the processing result. This additional external signal, i.e. the processing variable is not fed into the regulation system upstream of the regulation member, rather downstream thereof, and does not pass through the regulation system: i.e. the regulation variable of the regulation member is therefore influenced.

It has turned out that very good results can be obtained when the processing force of the ultrasound sonotrode is used as a process variable. This processing force depends on the processing course, but is generated outside of the electrical and mechanical resonant circuit.

It is also possible to use the processing temperature as a process variable, wherein the temperature at the tip of the ultrasound sonotrode is used. It is also feasible to use a path signal that reflects the deformation of the resonant system caused by the process.

The regulation means that generates the regulation variable is preferably a PID controller. Such regulation means have proven to be useful in the past and provide excellent regulation results in the inventive further development, wherein overswinging is damped such that disturbances are compensated for after a minimum time.

In a further development, a scaling element is provided upstream of the connecting point where the regulation variable and the process variable are connected, in particular, a proportional generator for the process variable. This scaling element adjusts the process variable such that the regulation variable is optimally influenced. The value determined by a force sensor is thereby e.g. multiplied by a factor. The process variable is thereby added to the regulation variable or subtracted therefrom. This is effected, in particular, via the scaling element, in particular, the proportional controller.

It is, however, also feasible to issue an artificially generated signal for the process variable which is entered manually. This signal can e.g. simulate a force dependence or the signal can be matched with time using an incremental generator, and be supplied to the connecting point. This signal is also not or only slightly influenced by the ultrasound oscillation. The process variable is thereby a predetermined signal that synchronously accompanies processing of the workpiece.

In a further development, the scaling element is designed as an adaptive system. The system may thereby be designed such that it recognizes recurring changes, and counteracts them in advance.

Further advantages, features and details of the invention can be extracted from the dependent claims and the following description which describes in detail a particularly preferred embodiment with reference to the drawing. The features shown in the drawing and mentioned in the description and the claims may be essential to the invention either individually or collectively in arbitrary combination.

DESCRIPTION OF THE PREFERRED EMBODIMENT

Figure 1:
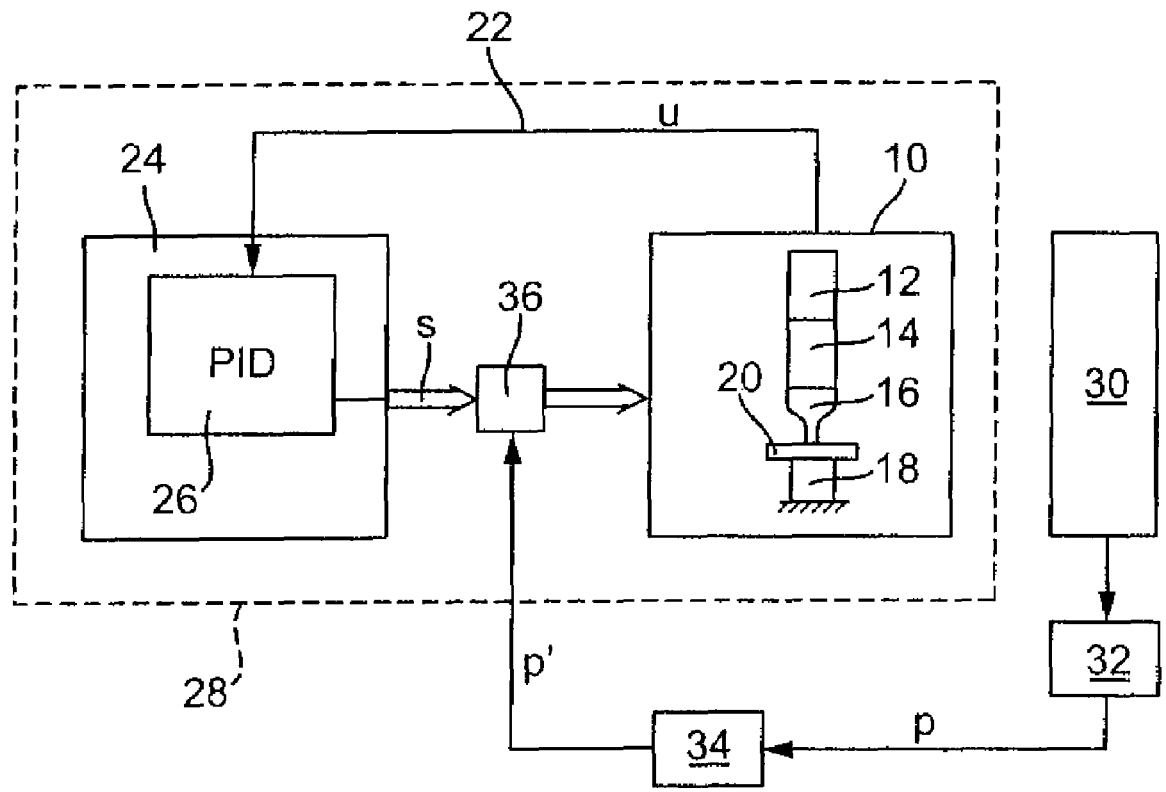
FIG. 1 shows a diagram of the regulation process.

FIG. 1 shows a diagram of a regulation device, in which reference numeral 10 designates an resonant system which has an ultrasound generator 12, a booster 14, an ultrasound sonotrode 16 and an anvil 18, wherein the ultrasound sonotrode 16 and the anvil 18 represent the tool for processing a workpiece 20.

Parameters and signals (u) from this resonant system 10 are supplied to a regulation means 24 via a return path 22. This regulation means 24 has a PID controller 26. The regulation means 24 generates a regulation variable (s) which is supplied to the resonant system 10 and, in particular, to the ultrasound generator 12. The resonant system 10 with regulation means 24 forms a regulated, electrical and mechanical resonant circuit 28, as is disclosed in prior art.

Reference numeral 30 designates a processing procedure, in particular, a welding process outside of the resonant circuit 28, since it is not directly influenced by the electrical and mechanical variables. This processing procedure 30 is connected to a force sensor 32 which detects the course of the welding force. The force sensor 32 determines a process variable (p) which is supplied to a scaling unit 34. This scaling unit 34 provides a scaled process variable (p') which is supplied to a connecting means 36. This connecting means 36 is located between the regulation means 24 and the resonant system 10, such that not only the scaled process variable (p') is supplied to the connecting means 36, but also the regulation variable (s). The connected variables (p') and (s) are supplied to the resonant system 10 and, in particular, to the ultrasound generator 12.

It is clearly shown that in the inventive system, a variable that is generated outside of the resonant circuit 28, i.e. the process variable (p), is supplied to the resonant system 10.

Figure 2:
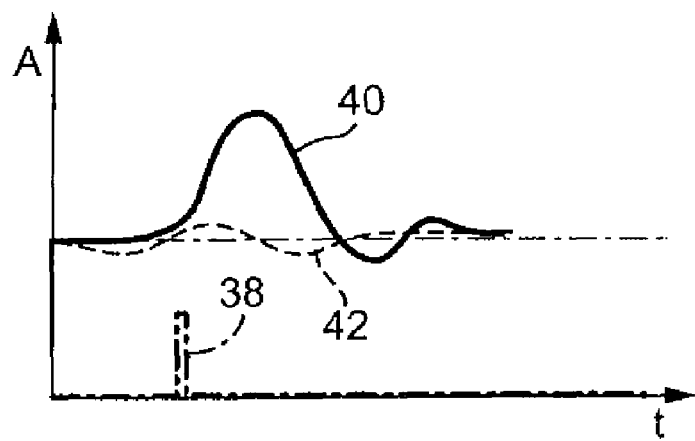
FIG. 2 shows an oscillation curve of the amplitude in case of a disturbance.

FIG. 2 shows the time dependence of the amplitude (A), wherein 38 indicates a disturbance signal. In conventional systems, the dependence of the amplitude signal 40 shows strong fluctuations with overswinging, wherein in the inventive system, the amplitude signal 42 is regulated much more quickly to the original value. One can also see that the regulation frequency is shorter than in a conventional system, in particular half.

Figure 3:
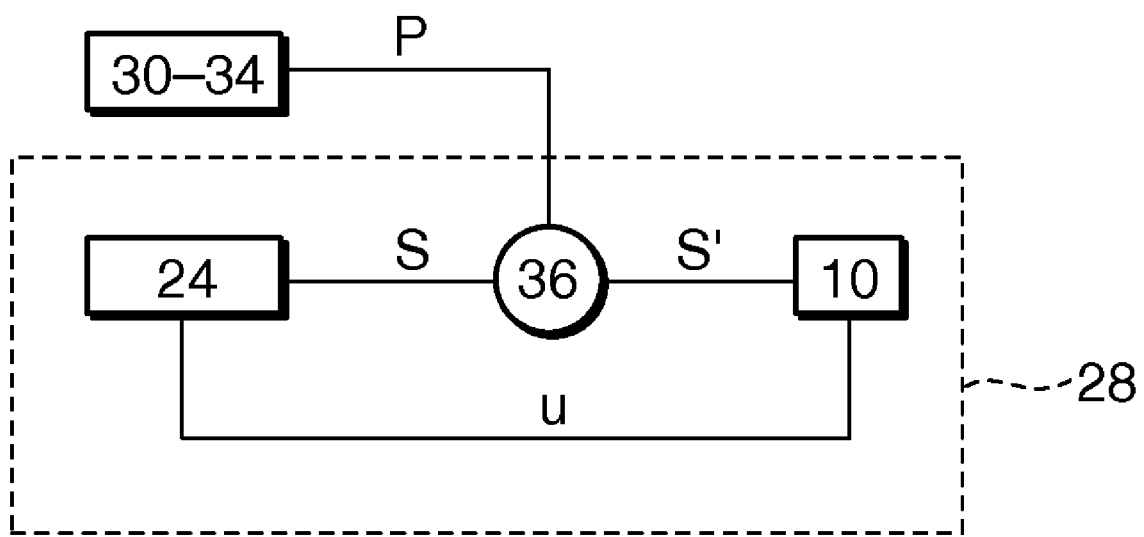
FIG. 3 shows a schematic circuit diagram of the device in accordance with the invention.

FIG. 3 schematically shows the circuit configuration of the device in accordance with the invention. The resonant circuit 28 contains resonant system 10, regulation means 24 and connecting means 36. The resonant system 10, the regulation means 24 and the connecting means 36 are thereby connected together in series within in a closed feedback regulation loop. The feedback signal u is passed from the resonant system 10 to the input of the regulation means 24. The regulation means 24 processes the feed back signal u to generate a regulation signal S. The regulation signal S is then passed to a first input of the connecting means 36. A process variable signal P is generated in units 30 to 34 and passed to a second input of the connecting means 36, thereby entering connecting means 36 in parallel with regulation signal S. The connecting means 36 thereby combine the regulation signal S and the process variable signal P to generated modified process variable signal S' for input into the resonant system 10. The process variable signal P is generated in response to processing of the workpiece and in dependence on a processing procedure and is extracted outside of the resonant system 10. The process variable signal P is substantially insensitive to high frequency fluctuations of mechanical and electrical variables within the resonant system 10, thereby preventing or damping feedback related oscillations thereof.

We claim:
1. A device for processing a workpiece using ultrasound, the device comprising:
a resonant system having an input, an ultrasound generator communicating with said input, an ultrasound sonotrode communicating with said ultrasound generator an anvil and an output, wherein the workpiece is processed between said anvil and said ultrasound sonotrode;
a feedback signal path communicating with said resonant system output to transmit a feedback signal;
a regulation means having a regulation member, said regulation means having an input receiving said feedback signal and an output emitting a regulation signal;
connecting means having a first input communicating with said output of said regulation means for receiving said regulation signal and an output communicating with said input of said resonant system, said connecting means also having a second input, wherein said resonant system, said feedback signal path, said regulation means and said connecting means are connected together in series within a closed feedback resonant circuit; and
means for generating a process variable signal in response to processing of the workpiece and in dependence on a processing procedure, said process variable signal being extracted outside of said resonant system and being substantially insensitive to high frequency fluctuations of mechanical and electrical variables within said resonant system, said processing variable generating means having an output from which said process variable signal is passed to said second input of said connecting means, wherein said process variable signal and said regulation signal thereby enter said connecting means in parallel, said connecting means then combining said process variable and said regulation variable to generate a modified regulation variable which is passed from said con- necting means output to said resonant system input, thereby preventing or damping feedback related oscillations thereof.

2. The device of claim 1, wherein said process variable is a processing force of said ultrasound sonotrode.

3. The device of claim 1, wherein said process variable is a processing temperature of a tip of said ultrasound sonotrode.

4. The device of claim 1, wherein said process variable is a signal that detects or reflects deformation of said resonant system.

5. The device of claim 1, wherein said process variable is a predetermined signal that synchronously accompanies processing of the workpiece.

6. The device of claim 1, wherein in said regulation means has a PID controller.

7. The device of claim 1, further comprising a scaling element or a proportional controller for the process variable, disposed upstream of said connecting point means.

8. The device of claim 7, wherein said scaling element is an adaptive system.

9. The regulation means of the device for processing a workpieces of claim 1.

* * * * *